(12) United States Patent
Forrest

(10) Patent No.: US 12,118,972 B2
(45) Date of Patent: Oct. 15, 2024

(54) SYSTEMS AND METHODS FOR MANUFACTURING ACOUSTIC PANELS

(71) Applicant: Chinook Acoustics, Inc., Redmond, WA (US)

(72) Inventor: Benjamin F. Forrest, Redmond, WA (US)

(73) Assignee: Chinook Acoustics, Inc., Redmond, WA (US)

( * ) Notice: Subject to any disclaimer, the term of this patent is extended or adjusted under 35 U.S.C. 154(b) by 256 days.

(21) Appl. No.: 17/452,964

(22) Filed: Oct. 29, 2021

(65) Prior Publication Data

US 2022/0139365 A1 May 5, 2022

Related U.S. Application Data

(60) Provisional application No. 63/108,037, filed on Oct. 30, 2020.

(51) Int. Cl.
*G10K 11/168* (2006.01)
*B32B 27/36* (2006.01)
(Continued)

(52) U.S. Cl.
CPC ............ *G10K 11/168* (2013.01); *B32B 27/36* (2013.01); *B32B 37/10* (2013.01);
(Continued)

(58) Field of Classification Search
CPC ....... G10K 11/168; B32B 27/36; B32B 37/10; B32B 37/1284; B32B 38/0004;
(Continued)

(56) References Cited

U.S. PATENT DOCUMENTS 2,130,919 A  9/1938 Gunnar et al.
2,694,025 A  11/1954 Slayter et al.
(Continued)

FOREIGN PATENT DOCUMENTS

CN  1243481 A  2/2000
CN  111016307 A  4/2020
(Continued)

OTHER PUBLICATIONS

International Preliminary Report on Patentability dated May 11, 2023 issued in International Patent Application No. PCT/US2021/057425.
(Continued)

*Primary Examiner* — Forrest M Phillips
(74) *Attorney, Agent, or Firm* — Dorsey & Whitney LLP

(57) ABSTRACT

The present disclosure relates to methods of manufacturing an acoustic absorption system. The acoustic absorption system can include a curtain that includes one or more insulating or acoustic absorption sheets. The manufacturing method uses press welding to seal the insulating sheets between a first layer of material and a second layer of material. Each insulating sheets is disposed within a corresponding compartment of the acoustic absorption system and an entire perimeter of each compartment can be sealed simultaneously, wherein the seals form a plurality of panels.

18 Claims, 11 Drawing Sheets

(51) Int. Cl.
*B32B 37/10* (2006.01)
*B32B 37/12* (2006.01)
*B32B 38/00* (2006.01)

(52) U.S. Cl.
CPC ...... *B32B 37/1284* (2013.01); *B32B 38/0004* (2013.01); *B32B 2307/102* (2013.01); *B32B 2307/412* (2013.01); *B32B 2307/72* (2013.01); *B32B 2307/732* (2013.01); *B32B 2310/0868* (2013.01); *B32B 2367/00* (2013.01)

(58) Field of Classification Search
CPC ........ B32B 2307/102; B32B 2307/412; B32B 2307/72; B32B 2307/732; B32B 2310/0868; B32B 2367/00
See application file for complete search history.

(56) References Cited

U.S. PATENT DOCUMENTS

| | | | |
|---|---|---|---|
| 2,706,306 A | 4/1955 | Sheetz et al. | |
| 3,866,001 A | 2/1975 | Kleinschmidt et al. | |
| 3,867,995 A | 2/1975 | Sanders | |
| 4,193,474 A * | 3/1980 | Okubo ................. | E04B 1/8227 181/290 |
| 4,566,558 A | 1/1986 | Link, Jr. et al. | |
| 4,607,466 A | 8/1986 | Allred | |
| 4,842,097 A * | 6/1989 | Woodward .......... | E04F 13/0867 181/290 |
| 4,885,891 A | 12/1989 | Lynch | |
| 5,202,174 A | 4/1993 | Capaul | |
| 5,411,623 A * | 5/1995 | Shutt .......................... | E04B 1/84 112/475.08 |
| 5,511,348 A | 4/1996 | Cornell et al. | |
| 5,765,334 A | 6/1998 | Vitous | |
| 5,813,160 A | 9/1998 | Thoelke | |
| 6,006,809 A | 12/1999 | Williams et al. | |
| 6,077,613 A | 6/2000 | Gaffigan | |
| 6,345,638 B1 | 2/2002 | Warner | |
| 6,446,751 B1 * | 9/2002 | Ahuja ..................... | A47H 23/02 181/290 |
| 6,478,039 B2 | 11/2002 | Suh | |
| 6,575,656 B2 | 6/2003 | Suh | |
| 6,613,424 B1 * | 9/2003 | Putt ......................... | E04C 5/073 181/294 |
| 6,742,309 B2 | 6/2004 | Stewart et al. | |
| 7,422,026 B2 | 9/2008 | Kim | |
| 7,503,428 B1 | 3/2009 | Johnson | |
| D624,768 S | 10/2010 | Clark et al. | |
| 7,905,323 B2 | 3/2011 | Larsen | |
| 7,913,812 B2 | 3/2011 | Sanders | |
| 8,091,605 B1 | 1/2012 | Melhart | |
| 8,136,626 B1 * | 3/2012 | Aliev ....................... | E04H 15/14 181/208 |
| 8,316,508 B2 | 11/2012 | Lapping | |
| 8,544,218 B2 | 10/2013 | Dellinger et al. | |
| 8,695,755 B2 | 4/2014 | Mihaly | |
| 8,708,098 B2 | 4/2014 | Roy | |
| 8,839,842 B2 * | 9/2014 | Ashelin .................... | E04B 2/74 160/40 |
| 11,620,974 B2 * | 4/2023 | Forrest ................. | G10K 11/168 181/287 |
| 2003/0102184 A1 | 6/2003 | Brisson et al. | |
| 2003/0219133 A1 | 11/2003 | Horrall et al. | |
| 2004/0182430 A1 | 9/2004 | Seo | |
| 2005/0161071 A1 | 7/2005 | Tseng | |
| 2005/0268562 A1 | 12/2005 | Thacher | |
| 2006/0042673 A1 | 3/2006 | Tseng | |
| 2006/0247919 A1 | 11/2006 | Specht et al. | |
| 2009/0107059 A1 | 4/2009 | Kipp et al. | |
| 2010/0078260 A1 | 4/2010 | McNeal, Jr. | |
| 2010/0175810 A1 | 7/2010 | Korwin-Edson et al. | |
| 2010/0224442 A1 | 9/2010 | Sanders | |
| 2012/0305042 A1 | 12/2012 | Lorbiecki | |
| 2013/0185061 A1 | 7/2013 | Arvanaghi et al. | |
| 2013/0186706 A1 | 7/2013 | Bliton et al. | |
| 2013/0199868 A1 | 8/2013 | Bergiadis | |
| 2015/0003625 A1 | 1/2015 | Uhle et al. | |
| 2015/0034415 A1 | 2/2015 | Furusawa et al. | |
| 2015/0055790 A1 | 2/2015 | Kawakami et al. | |
| 2015/0139435 A1 | 5/2015 | Forrest et al. | |
| 2016/0253987 A1 * | 9/2016 | Chattell ................... | H04S 7/00 381/73.1 |
| 2017/0221468 A1 | 8/2017 | Forrest et al. | |
| 2019/0047774 A1 * | 2/2019 | Veiseh ..................... | B32B 3/12 |
| 2019/0156812 A1 | 5/2019 | Bixel | |
| 2020/0013383 A1 | 1/2020 | Forrest | |

FOREIGN PATENT DOCUMENTS

| | | | |
|---|---|---|---|
| CN | 111688599 A | 9/2020 | |
| EP | 0467867 | 1/1992 | |
| EP | 2919341 A1 * | 9/2015 | ......... B60R 16/0207 |
| JP | 2009317047 | 12/1997 | |
| JP | 2009257080 | 11/2009 | |
| JP | WO2020084802 A1 * | 11/2021 | ........... G10K 11/172 |
| KR | 101415321 B1 | 7/2014 | |
| WO | 2008120071 | 10/2008 | |
| WO | 2018170131 | 9/2018 | |

OTHER PUBLICATIONS

International Search Report (ISR) and Written Opinion (WO) dated Jun. 28, 2018 for international application PCT/ US2018/022439.
International Search Report and Written Opinion dated Feb. 18, 2022 received in International patent application No. PCT/US2021/057425.
Notice of Allowance dated Feb. 1, 2023 received in U.S. Appl. No. 16/493,041.
Forrest , Office Action dated Dec. 30, 2021 for U.S. Appl. No. 16/493,041.
Forrest , et al., Office Action dated Dec. 16, 2016 for U.S. Appl. No. 14/543,695.
Forrest , et al., Office Action dated Jun. 21, 2019 for U.S. Appl. No. 15/422,308.
Forrest , et al., Office Action dated May 26, 2016 for U.S. Appl. No. 14/543,695.
Lorbiecki , Office Action dated Jul. 24, 2013 for U.S. Appl. No. 13/153,202.
Lorbiecki , Office Action dated May 13, 2016 for U.S. Appl. No. 13/153,202.
Non-Final Office Action dated Feb. 15, 2024 issued in U.S. Appl. No. 18/166,351.
Notice of Allowance dated Mar. 29, 2024 issued in U.S. Appl. No. 18/166,351.

* cited by examiner

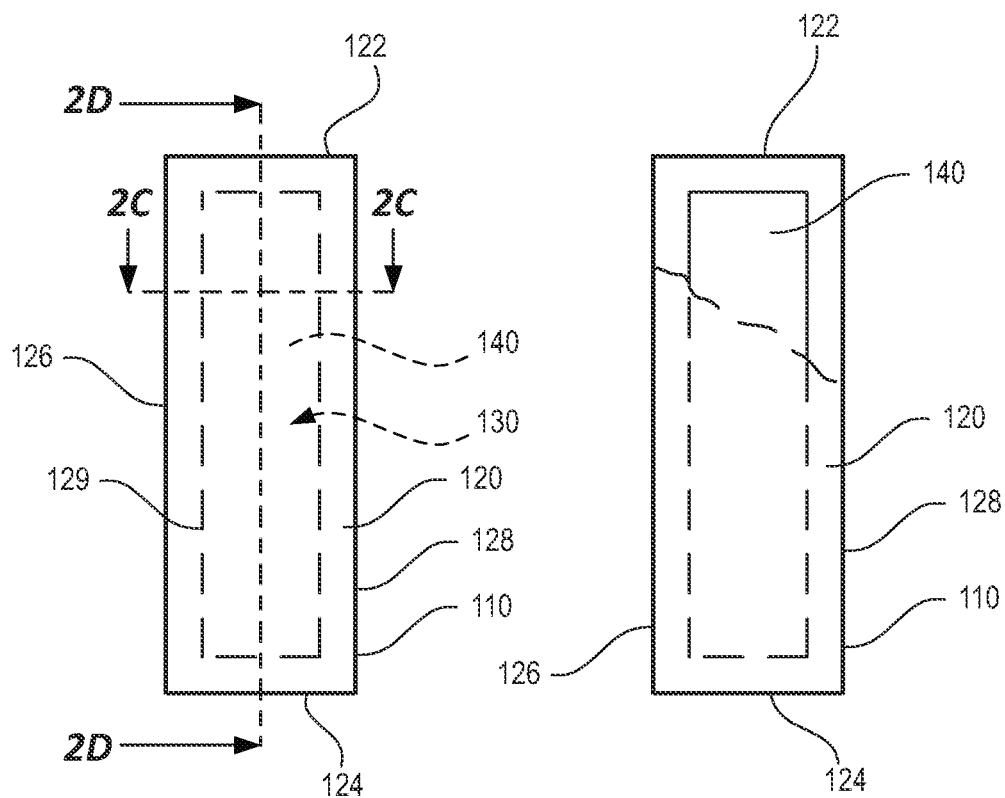
FIG. 2A
FIG. 2B
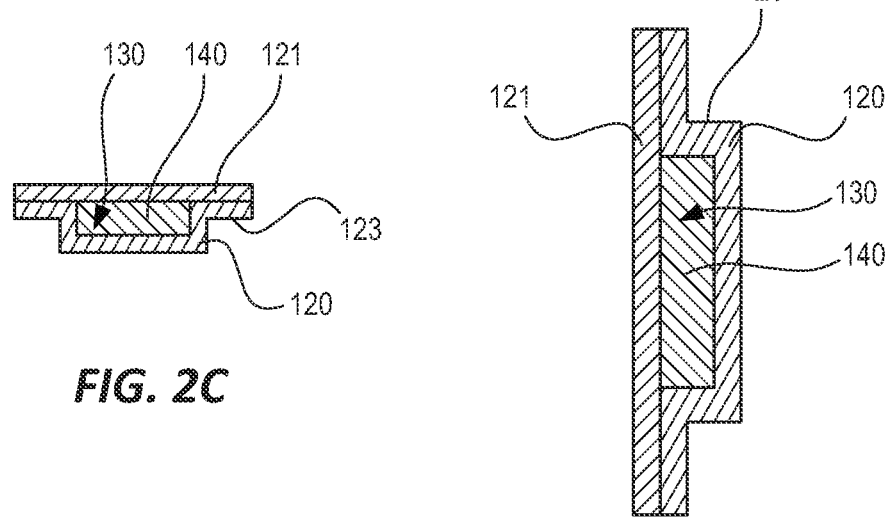
FIG. 2C
FIG. 2D

SYSTEMS AND METHODS FOR MANUFACTURING ACOUSTIC PANELS

RELATED APPLICATIONS

This application claims priority to U.S. Provisional Application No. 63/108,037, filed on Oct. 30, 2020 and titled "SYSTEMS AND METHODS FOR MANUFACTURING ACOUSTIC PANELS," which is hereby incorporated by reference in its entirety.

TECHNICAL FIELD

The present disclosure is generally directed towards acoustic absorption systems and methods of manufacturing acoustic absorption systems. More specifically, the disclosure relates to methods of manufacturing acoustic absorption systems that provide sound dampening, wherein the acoustic absorption system is able to be sterilized and/or prevent absorption of microbes and other contaminants into the sound absorbing medium.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

FIG. 2A is a plan view of an acoustic absorption panel, according to the embodiment of FIG. 1.

FIG. 2B is a plan view of the acoustic absorption panel of FIG. 2A, depicting a cut-away portion.

FIG. 2C is a cross-sectional view of the acoustic absorption panel of FIG. 2A, through plane 2C-2C of FIG. 2A.

FIG. 2D is another cross-sectional view of the acoustic absorption panel of FIG. 2A, through plane 2D-2D of FIG. 2A.

DETAILED DESCRIPTION

Figure 1:
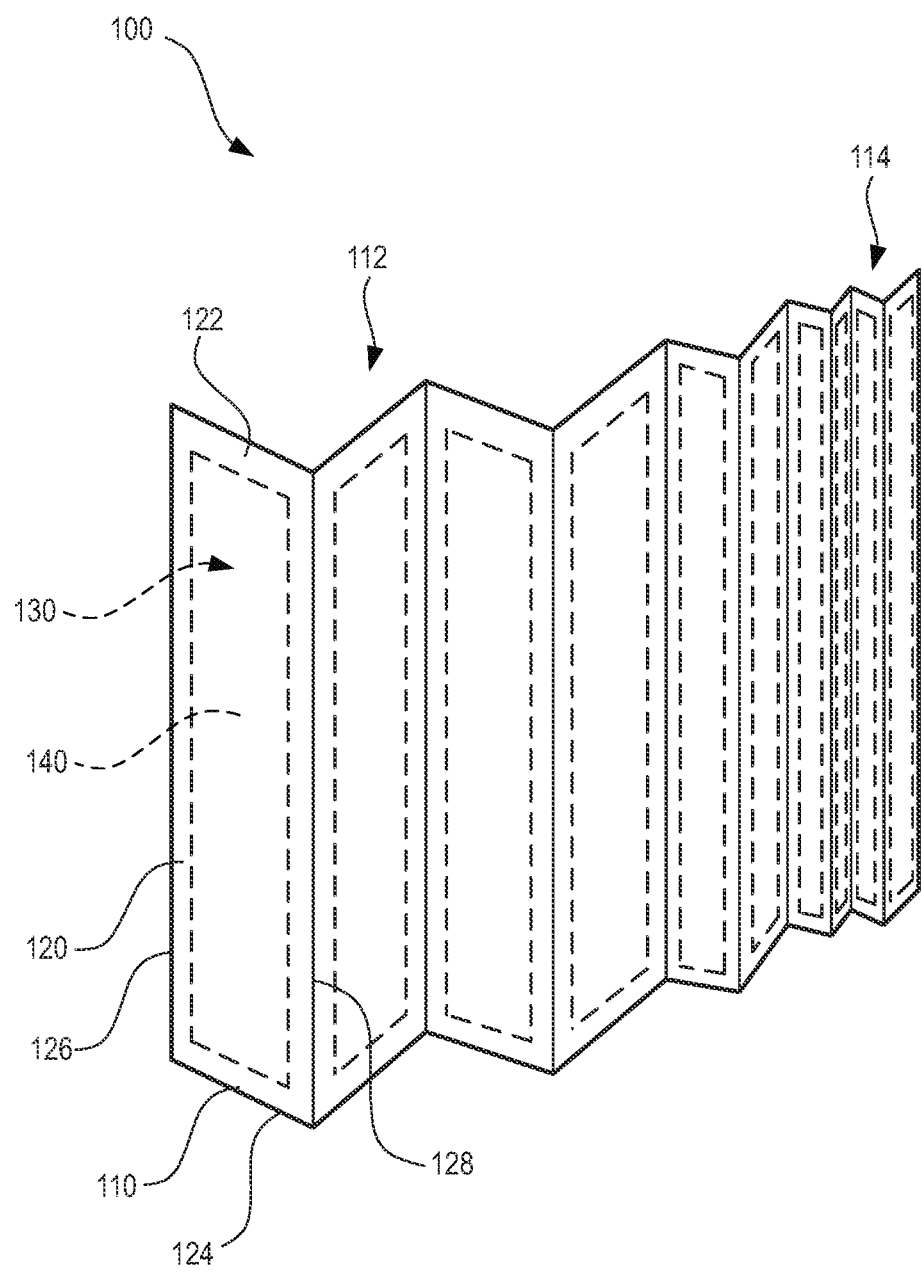
FIG. 1 is a perspective view of an acoustic absorption system, according to an embodiment of the present disclosure.

The embodiments of the present disclosure are generally directed towards systems and methods for acoustic absorption. Systems for providing sound absorption can reduce confusion, strain, anxiety, and miscommunication. Absorbing and/or controlling sound can also improve privacy, as the volume of a conversation can be dampened and/or reduced as it travels from one area to another. In some environments, sound absorption under sanitary conditions is particularly important, such as in medical facilities and laboratories. However, acoustic media generally comprise a porous material such as carbon fiber, polyurethane, polyester, fiberglass, other fibrous material, or other foam material. This can be especially problematic when contamination is a concern in the environment because porous materials create a location for contaminants to reside that is protected from many cleaning materials. Additionally, porous material can retain odor causing contaminants that may be unpleasant.

In a medical facility, for example, contaminants such as bacteria and viruses can spread diseases. In a laboratory, as another example, contaminants can affect experiments and procedures. In a restroom, as yet another example, contaminants can affect the odor of the room. The sound absorption systems within the scope of this disclosure may be sanitizable and not contaminant absorptive, and may be used, for example, within the environments as discussed above. As further detailed below, the sound absorption systems within the scope of this disclosure can also exhibit antimicrobial properties. The sound absorption systems can also be tear and/or flame resistant.

Embodiments may be best understood by reference to the drawings, wherein like parts are designated by like numerals throughout. It will be readily understood that the components of the present disclosure, as generally described and illustrated in the drawings herein, could be arranged and designed in a wide variety of different configurations. Thus, the following more detailed description of the embodiments of the apparatus is not intended to limit the scope of the disclosure, but is merely representative of possible embodiments of the disclosure. In some cases, well-known structures, materials, or operations are not shown or described in detail. While the various aspects of the embodiments are presented in drawings, the drawings are not necessarily drawn to scale unless specifically indicated.

The phrases "connected to," "coupled to," and "in communication with" refer to any form of interaction between two or more entities, including but not limited to mechanical, electrical, magnetic, electromagnetic, fluid, and thermal interaction. Two components may be coupled to each other even though they are not in direct contact with each other. For example, two components may be coupled to each other through an intermediate component.

FIG. 1 depicts an acoustic absorption system 100 according to an embodiment of the present disclosure. The acoustic absorption system 100 can be configured to reflect and/or absorb acoustical energy or sound. As shown in FIG. 1, the acoustic absorption system 100 can comprise a flexible curtain 110. The flexible curtain 110 comprises one or more acoustic absorption panels 120, each of which can comprise a pocket or compartment 130 (shown in phantom). A sound absorbing or insulating sheet 140 (shown in phantom) can also be disposed within the compartment 130. Exemplary types of curtains that can be used are described in U.S. Pat. No. 6,446,751, which is incorporated by reference in its entirety.

The panels 120 of the curtain 110 can be made of various types of materials. In some embodiments, for example, the panels 120 comprise material that is sanitizable. In such embodiments, the panels 120 can be cleaned or cleansed, e.g., with water, soap, disinfectants (e.g., phenolic disinfectants), and/or other types of cleaners (e.g., bleach).

Cleanable and/or sanitizable panels 120 can be advantageous in many ways. For example, cleanable and/or sanitizable panels 120 can be economically advantageous when compared to disposable curtains that are disposed of after being used for a period of time. The cleanable and/or sanitizable panels 120 disclosed herein can also be wiped and/or otherwise cleaned in place (e.g., while remaining hung or draped from a wall or ceiling in an environment). In other words, the curtain 110 need not be removed for washing and/or laundering. Such clean-in-place curtains 110 can minimize and/or save on cleaning time and costs when compared to curtains that need to be removed (e.g., taken down), washed, and reinstalled on a reoccurring basis.

The material of the panels 120 can also be non-absorbent or substantially non-absorbent. The material of the panels 120 can also be resistant to staining. For example, the panels 120 can be resistant to stains from oils, greases, and/or other contaminants (e.g., blood and/or other bodily fluids). Stain resistance can also be advantageous and can save on replacement costs for the curtains 110.

In further embodiments, the material of the panels 120 also exhibits antimicrobial properties. For example, the panels 120 can comprise antimicrobial agents that kill and/or inhibit the growth of microorganisms such as bacteria, fungi, etc. The panels 120 can also be odor resistant. For example, the panels 120 can be resistant to odors that arise from bacteria (or bacterial growth). As previously mentioned, the panels 120 are also non-absorbent or substantially non-absorbent, such that other odor sources are not absorbed (or substantially absorbed) into the panels 120. In some embodiments, the panels 120 comprise a material that exhibits antimicrobial properties in accordance with ISO 22196. In other words, the material achieves a pass rating when tested in accordance with ISO 22196.

In yet further embodiments, the panels 120 are also flame resistant. For example, the panels 120 can comprise a material (e.g., a fabric) that is flame resistant, or resistant to combustion. A flame resistant material can also be a material that is resistant to burning. For example, a flame resistant material can exhibit self-extinguishing properties such that it ceases to burn once a flame or heat source is removed from its vicinity. In some embodiments, the panels 120 comprise a material that is flame resistant in accordance with ASTM D6413. In other words, the material achieves a pass rating when tested in accordance with ASTM D6413. In certain embodiments, the panels 120 and/or curtain 110 achieves a pass rating when tested in accordance with National Fire Protection Associate—NFPA 701. In other words, the panels 120 and/or curtain 110 satisfy National Fire Protection Associate—NFPA 701.

The material of the panels 120 can also be strong, such that it is not easily torn or damaged. For example, the panels 120 can withstand cleaning and/or wiping procedures without being damaged or degraded by cleaning agents. And in still further embodiments, the panels 120 exhibit antistatic properties, such that they are resistant to the build-up of electrostatic charge.

In certain embodiments, the panels 120 comprise a polymeric material. Exemplary polymeric materials that can be used include polyethylene, polyethylene terephthalate (polyester), vinyls or polyvinyls (e.g., polyvinyl chloride, polyvinyl fluoride, etc.) including medical grade vinyls, copolymers, and/or blends thereof.

As further shown in FIG. 1, each panel 120 comprises a first edge 122 (or upper edge), a second edge 124 (or lower edge), a first lateral edge 126 (or first side edge), and a second lateral edge 128 (or second side edge). The lateral edges 126, 128 of adjacent panels are also coupled together. In some embodiments, individual panels 120 are formed from a single curtain 110. For example, a curtain 110 can be divided, such as by seals (e.g., heat seals or welds), to form a plurality of panels 120 and compartments 130. In other embodiments, a plurality of panels 120 can be joined together to form a curtain 110.

The panels 120 and curtain 110 are also flexible and/or non-rigid. In some embodiments, such as the embodiment depicted in FIG. 1, the curtain 110 can also be folded such that adjacent panels 120 become substantially superimposed with each other. A folded configuration can also be referred to as a closed or substantially closed configuration, while a non-folded or spread configuration can be referred to as an open or substantially open configuration. With reference to FIG. 1, for example, the panels 120 of the first section 114 are in a more folded or closed configuration as compared to the panels 120 of the second section 112, which are more spread apart. In still further embodiments, the panels 120 can be described as being disposed in an accordion-like fashion.

FIGS. 2A-2D depict an acoustic absorbent panel 120, or a portion of the curtain 110 of FIG. 1. In particular, FIG. 2A depicts a plan view of the panel 120; FIG. 2B depicts a plan view of the panel 120 of FIG. 2A with a cut-away portion; FIG. 2C depicts a cross-sectional view of the panel 120 of FIG. 2A, taken along the viewing plane 2C-2C; and FIG. 2D depicts a cross-sectional view of the panel 120 of FIG. 2A, taken along the viewing plane 2D-2D.

As shown in FIGS. 2A-2D, the panel 120 comprises a compartment 130 that is disposed within the edges 122, 124, 126, 128 of the panel 120. An insulating or sound absorbing sheet 140 can also be disposed within the compartment 130. With reference to FIGS. 2C and 2D, in certain embodiments, the panel 120 extends around the periphery of the insulating sheet 140, such that the insulating sheet 140 can be described as being enclosed or encapsulated within the panel 120. As further shown in FIGS. 2C and 2D, the panel 120 can comprise a first face 121 and a second face 123. Each face 121, 123 can be formed of a segment of material, which can then be coupled or joined (e.g., through adhesives, seals, etc.) to form the panel 120 and compartment 130 of the curtain 110.

For example, in one embodiment, an insulating or sound absorbing sheet 140 can be disposed between two faces 121, 123 or segments of material. The faces 121, 123 or segments of material can then be coupled or joined on one, two, three, or four sides of the insulating or sound absorbing sheet 140, which can then retain, enclose, or encapsulate the insulating or sound absorbing sheet 140. In a particular embodiment, the faces 121, 123 or segments of material are joined by an adhesive. In another embodiment, the faces 121, 123 or segments of material are joined by seals, such as heat seals or heat welds. The adhesive and/or seals (e.g., heat seals) can extend around a perimeter or a periphery of the insulating or sound absorbing sheet 140, or only a portion thereof as desired. In other embodiments, a portion of the compartment can be formed first (such as into a three-sided pocket-like structure), after which an insulating or sound absorbing sheet 140 can be disposed therein. In other embodiments, the faces 121, 123 or segments of material are coupled or joined around the insulating or sound absorbing sheet 140 (e.g., on all sides) simultaneously.

The insulating or sound absorbing sheet 140 can include various types of materials. Exemplary materials include, but are not limited to, cotton, polyester, wool, rayon, hemp, burlap, other plant-based fabrics, and plastics.

The insulating sheet 140 can also comprise materials of various densities. In some embodiments, the insulating sheet 140 comprises multiple regions of material having different and distinct densities. Different densities of material can have different sound absorption capabilities and may target various frequency ranges of sounds. In some embodiments, the insulating sheet 140 comprises a material having a density of between about 1 and about 6 lb/ft$^3$, between about 2 and about 5 lb/ft$^3$, between about 3 and about 5 lb/ft$^3$, or between about 4 and about 5 lb/ft$^3$. In further embodiments, the insulating sheet 140 comprises a material having a density of about 4.5 lb/ft$^3$. And in yet further embodiments, the insulating sheet 140 comprises a material having a density of no greater than about 6 lb/ft$^3$, no greater than about 5 lb/ft$^3$, or no greater than about 4.5 lb/ft$^3$.

In some embodiments, the insulating sheet 140 comprises a material having a higher density, such as density of between about 8 lb/ft$^3$ and about 12 lb/ft$^3$, or between 8 lb/ft$^3$ and 10 lb/ft$^3$. In further embodiments, the insulating sheet 140 comprises a material having a density of about 9 lb/ft$^3$.

Various thicknesses of insulating sheets 140 can also be used. For example, in some embodiments, the thickness of the insulating sheet 140 is between about ¼ inch and about 1 inch, or between about ¼ inch and about ¾ inch. In further embodiments, the thickness of the insulating sheet 140 is about ½ inch. Greater or lesser thicknesses can also be used, such as less than about 1 inch, less than about ¾ inch, or less than about ½ inch. In some embodiments two or more insulating sheets 140 can be stacked or otherwise superimposed on one another within a panel 120. For example, two or more insulating sheets 140 can be used to absorb or otherwise dampen two or more different acoustic energies or frequencies.

In some embodiments, the thickness of the insulating sheet 140 is between about ⅛ inch and about ⅝ inch, or between ¼ inch and ½ inch. In further embodiments, the thickness of the insulating sheet 140 is about ¼ inch. In a particular embodiment, the insulating sheet 140 comprises a material having a higher density, such as density of between about 8 lb/ft$^3$ and about 12 lb/ft$^3$, or between 8 lb/ft$^3$ and 10 lb/ft$^3$, and a thickness of between about ⅛ inch and about ⅝ inch, or between ¼ inch and ½ inch.

Figure 3A:
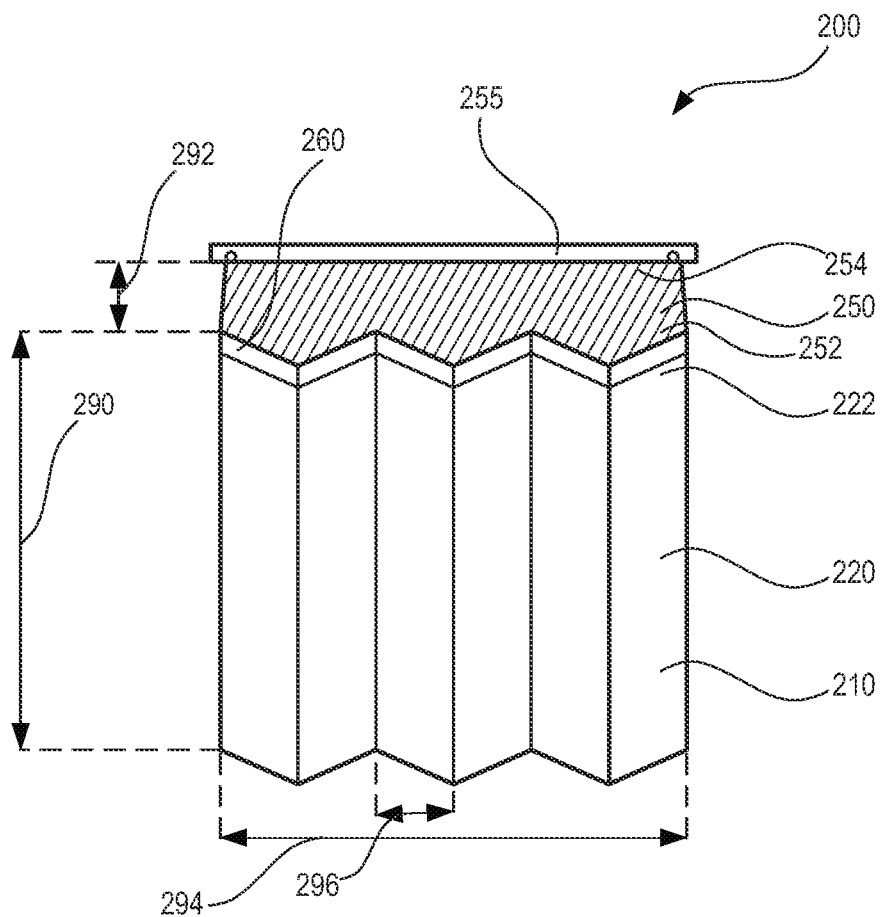
FIG. 3A is a perspective view of an acoustic absorption system, according to another embodiment of the present disclosure.
Figure 3B:
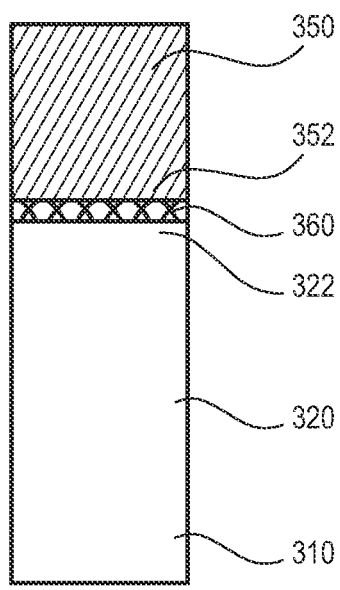
FIG. 3B is a plan view of an acoustic absorption panel, according to an embodiment of the present disclosure.
Figure 3C:
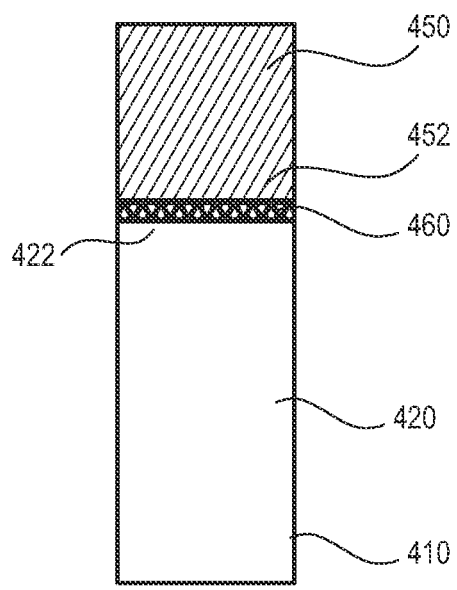
FIG. 3C is a plan view of an acoustic absorption panel, according to another embodiment of the present disclosure.

FIGS. 3A-3C are views of another embodiment of a sound absorbing system 200 comprising a curtain 210. The curtain 210 can, in certain respects, resemble components of the curtain 110 described in connection with FIG. 1 above. It will be appreciated that the illustrated embodiments may have analogous features. Accordingly, like features are designated with like reference numerals, with the leading digits incremented to "2." (For instance, the curtain is designated "110" in FIG. 1, and an analogous curtain is designated as "210" in FIG. 3A.) Relevant disclosures set forth above regarding similarly identified features thus may not be repeated hereafter. Moreover, specific features of the curtain 210 and related components shown in FIGS. 3A-3C may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the curtain of FIGS. 3A-3C. Any suitable combination of the features, and variations of the same, described with respect to the curtain 210 and components illustrated in FIG. 1, can be employed with the curtain 210 and components of FIGS. 3A-3C, and vice versa. This pattern of disclosure applies equally to further embodiments disclosed herein.

As shown in FIG. 3A, in some embodiments a first edge or end 222 (e.g., an upper end) of the curtain 210 (or panel 220) can be coupled to a first end 252 of an extension member 250. A second end 254 of the extension member 250 can then be coupled to a rail, mount, wall, and/or ceiling structure 255. In some embodiments, the extension member 250 comprises a fabric or mesh material. Other types of materials can also be used.

The curtain 210 can be coupled to the extension member 250 in various ways. For example, in certain embodiments, the curtain 210 is coupled at a coupling region 260 using a permanent fastener such as a stitching element. Other types of permanent fasteners can be used, including, but not limited to, staples, adhesives, seals (e.g., heat seals), etc. Permanent fasteners can be configured to permanently couple the curtain 210 to the extension member 250.

In other embodiments, the curtain 210 is coupled at a coupling region 260 using a temporary fastener such as a zipper element. Other types of temporary fasteners can also be used, including, but not limited to, hook and hook fasteners, and hook and loop fasteners. Temporary fasteners can be configured to temporarily couple the curtain 210 to the extension member 250. For example, a temporary fastener can be configured such that the curtain 210 can be removed from the extension member 250 at a user's discretion. As can be appreciated, one portion of the fastener (e.g., zipper, hook and hook closure, etc.) can be disposed on the curtain 210, while a second complementary portion of the fastener can be disposed on the extension member 250.

In some embodiments, temporary fasteners can be advantageous. For example, curtains 210 using a temporary fastener can be easily removed, while leaving the extension member 250 coupled to the rail, mount, wall, and/or ceiling structure 255. For example, a curtain 210 can be removed for cleaning (e.g., wiping), and later recoupled to the extension member 250. As another example, a first curtain 210 can be uncoupled from the extension member 250 and replaced with a second curtain 210, which is then coupled to the extension member 250.

FIG. 3B depicts a panel 320 of a curtain 310 coupled to an extension member 350 using a permanent fastener. In particular, a first end 322 of the panel 320 is coupled to a first end 352 of the extension member 350 at a coupling region 360 using a stitching element. Other types of permanent fasteners can also be used.

FIG. 3C depicts a panel 420 of a curtain 410 coupled to an extension member 450 using a temporary fastener. In particular, a first end 422 of the panel 420 is coupled to a first end 452 of the extension member 450 at a coupling region 460 using a zipper element. As can be appreciated, one portion of the zipper element can be disposed on the curtain 410, while a second complementary portion of the zipper element can be disposed on the extension member 450. Other types of temporary fasteners can also be used.

Figure 4:
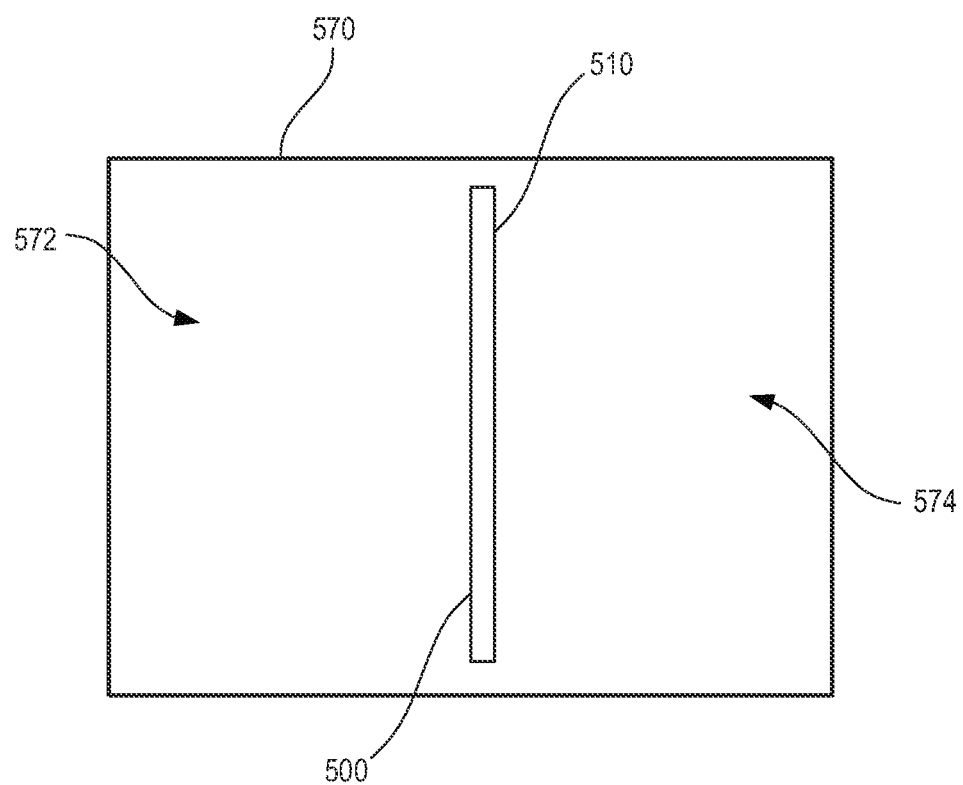
FIG. 4 is a plan view of an area having an acoustic absorption system disposed therein, according to another embodiment of the present disclosure.

Methods of making and/or using the acoustic absorption systems are also disclosed herein. In particular, it is contemplated that any of the components, principles, and/or embodiments discussed above may be utilized in either an acoustic absorption system or a method of making and/or using the same. An illustrative method of using an acoustic absorption system, according to one embodiment of the present disclosure, is depicted in FIG. 4. As shown in FIG. 4, in one embodiment a method of using the acoustic absorption system 500 can comprise controlling noise in an area 570. For example, the acoustic absorption system 500 can be configured to absorb sound or noise. The acoustic absorption system 500 can also be configured to reflect sound, such that the sound is at least partially retained within an isolated area.

In some embodiments, the method includes a step of obtaining an acoustic absorption system 500 comprising a flexible curtain 510 as disclosed herein. The method can further include a step of disposing the acoustic absorption system 500 (e.g., such as from a ceiling or mounting structure) in an area 570 such that the acoustic absorption system 500 divides the area 570 into a first sub-area 572 and a second sub-area 574. When disposed in such a manner, the acoustic absorption system 500 can be configured to dampen, absorb, or otherwise reduce the volume of a sound (such as a sound from a conversation, or a sound from a device (e.g., tv, radio, equipment, etc.), etc.) originating in either the first or second sub-area 572, 574. For example, the acoustic absorption system 500 can be configured to at least partially absorb sound, dampen sound, or otherwise reduce the volume of a sound traveling from the first sub-area 572 into the second sub-area 574, and vice versa. The acoustic absorption system 500 can also be configured to at least partially reflect sound, thereby at least partially retaining the sound within the sub-area 572, 574 in which the sound is originated.

In certain embodiments, the method can also include a step of cleaning or sanitizing the acoustic absorption system, optionally while the acoustic absorption system remains in place. The method can also include a step of removing the acoustic absorption system, such as uncoupling the flexible curtain from an extension member, and recoupling the flexible curtain with the extension member (or coupling a second flexible curtain with the extension member). Additional steps, and/or methods, can also be employed.

An illustrative method of making an acoustic absorption system can include a step of forming a panel that comprises an insulating or sound absorbing sheet. For example, in one embodiment, an insulating or sound absorbing sheet or material can be disposed between two faces or segments of panel forming material. The faces or segments of panel forming material can then be coupled or joined to one another. For instance, the faces or segments of panel forming material can be joined on one, two, three, or four sides of the insulating or sound absorbing sheet to form at least a portion of a boundary or perimeter around the insulating or sound absorbing sheet. In certain embodiments, the faces or segments are joined such that the insulating or sound absorbing sheet is retained, enclosed, or encapsulated by the material of the panel.

The segments of panel forming material can be joined in various ways, such as by an adhesive or a seal (e.g., a heat seal). The segments of panel forming material can also be joined continuously around the perimeter or periphery of the insulating or sound absorbing sheet, or intermittently at spaced apart regions.

In another illustrative method, the segments of panel forming material can be joined (e.g., with an adhesive and/or seals (e.g., heat seals)) to form a portion of a compartment prior to disposing the insulating or sound absorbing sheet therein. For instance, a two- or three-sided pocket-like structure can be formed, after which an insulating or sound absorbing sheet can be disposed therein. Optionally, the remaining portion of the perimeter or periphery can thereafter be closed or sealed if desired. In other embodiments, the segments of panel forming material are coupled or joined around the insulating or sound absorbing sheet on all sides simultaneously. Additional steps, and/or methods, can also be employed.

Figure 5:
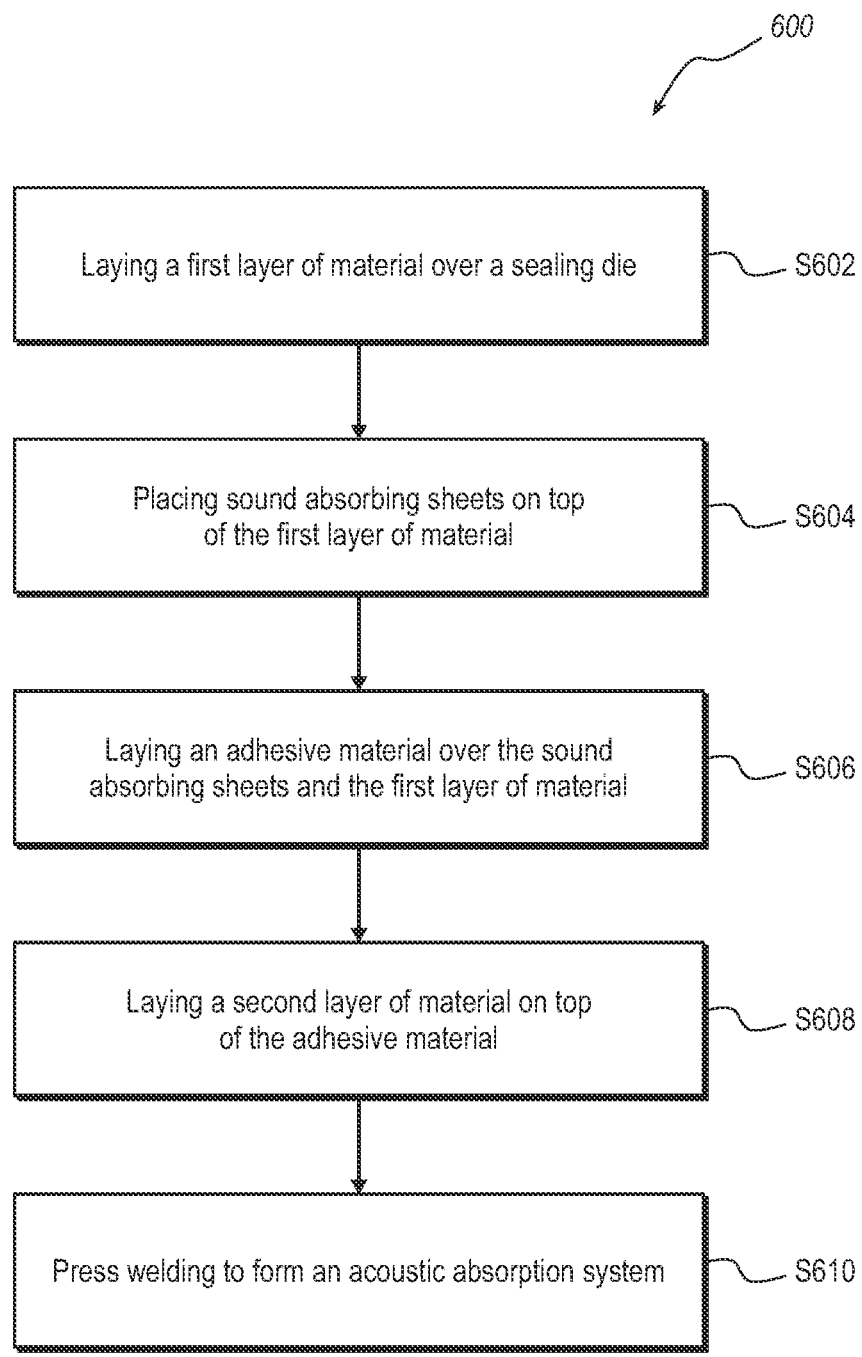
FIG. 5 is a flowchart of a method of manufacturing an acoustic absorption system.

FIG. 5 illustrates a flowchart of a method 600 or process of manufacturing an acoustic absorption system 100 using press welding in accordance with an embodiment of the present disclosure. FIGS. 6-11 illustrate the various steps in the process. As shown therein, the steps of manufacturing the acoustic absorption system may comprise a plurality of steps. With reference to FIG. 5, for instance, a first step S602 can include laying a first layer of material over a sealing die. A second step S604 can include placing one or a plurality of insulating sheets on top of the first layer of material. A third step S606 can include optionally laying an adhesive material over the insulating sheets and the first layer of material. If desired, the adhesive material can optionally be disposed beneath the insulating sheets (e.g., between the insulating sheets and the first layer of material.) In other embodiments, no adhesive material is used. A fourth step S608 can include laying a second layer of material on top of the adhesive material (or on top of the insulating sheets). A fifth step S610 can include applying the press welding to form the acoustic absorption system 100.

Figure 6:
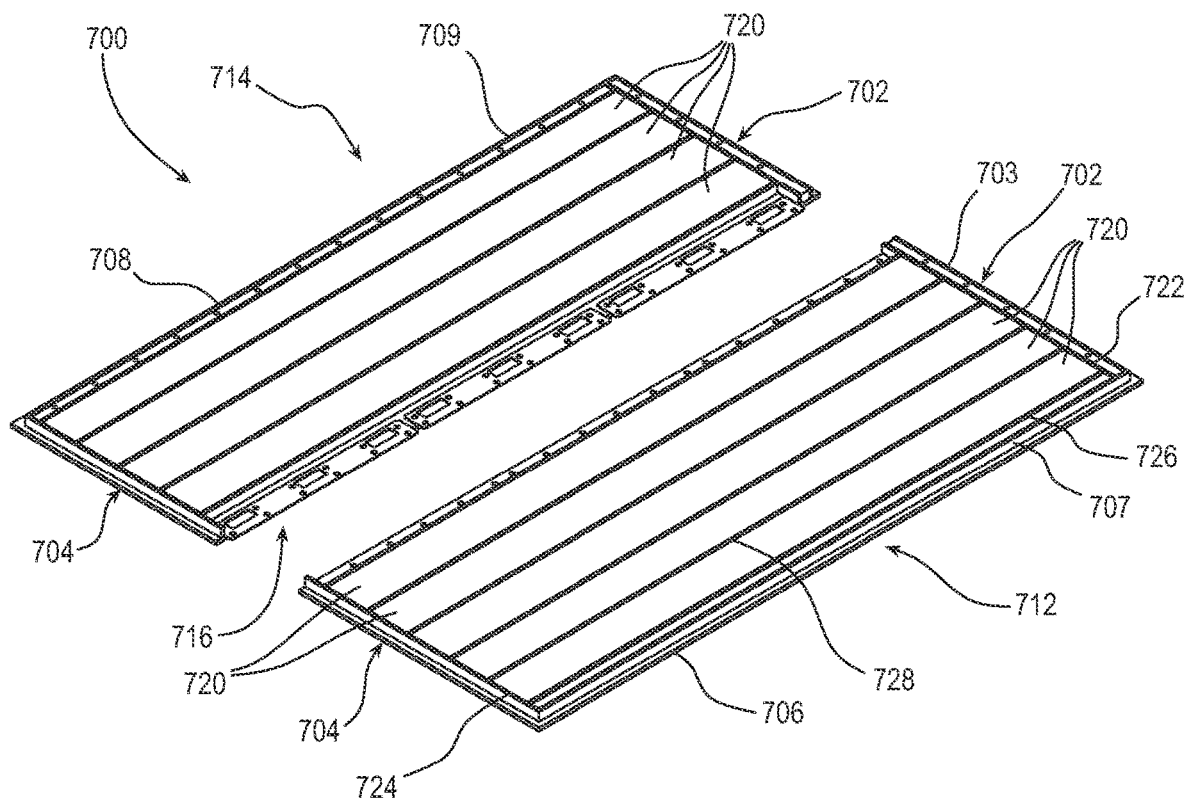
FIG. 6 is a perspective view of a sealing die for manufacturing an acoustic absorption system, according to one embodiment of the present disclosure.

FIG. 6 illustrates a sealing die 700 for manufacturing the acoustic absorption system 100. Sealing dies can be used to form material for various products in press welding. The shape of the sealing die 700 helps form the shape of the acoustic absorption system 100 and the sealing die 700 may also be used to help in trimming the acoustic absorption system 100. The sealing die 700 may be fabricated from a number of different materials that are able to withstand the temperature of the press welding. For example, the sealing die may be fabricated from aluminum, brass, steel, or any other suitable material or combination of suitable materials.

The sealing die 700 comprises a first edge 702 (or upper edge), a second edge 704 (or lower edge), a first lateral edge 706 (or first side edge), and a second lateral edge 708 (or second side edge) that correspond with the edges of the acoustic absorption system 100. In the illustrated embodiment, the sealing die 700 comprises a first edge 702 and a second edge 704. The first portion 712 and the second portion 714 may be coupled via a coupling mechanism 716. The first portion 712 and the second portion 714 may be coupled together to form the sealing die 700 before the processing of manufacturing the acoustic absorption system 100 begins. In other embodiments, the sealing die 700 is a single component. In some embodiments, the sealing die 700 comprises a plurality of portions, to enable the manufacture of acoustic absorption systems 100 with different lengths. For instance, one or more inserts may also be used to extend the length of the acoustic absorption system 100.

The sealing die 700 further comprises a plurality of pockets, recesses, or pockets 720. The plurality of pockets 720 extend a height of the sealing die 700, e.g., the same direction as the first lateral edge 726 and the second lateral edge 728. In the illustrated embodiment, each of the pockets 720 have the same width. In some embodiments, the widths of the pockets 720 may vary. For example, the widths of the pockets 720 in the first portion 712 may have a first width, and the widths of the pockets 720 in the second portion 714 may have a second width, different from the first width. In some embodiments, the widths of the pockets 720 in the first portion 712 may vary and the widths of the pockets 720 in the second portion 714 may vary.

Each pocket or cavity 720 is configured to form the panels 120 of the acoustic absorption system 100. For instance, the pockets 720 can help define and/or form the compartments 130 in each panel 120 housing the insulating or sound absorbing sheets 140. As shown in the illustrated embodiment, each pocket 720 comprises a rectangular perimeter that helps define and/or form the panels 120. Each pocket 720 comprises a first edge 722 (or upper edge), a second edge 724 (or lower edge), a first lateral edge 726 (or first side edge), and a second lateral edge 728 (or second side edge) that correspond with the edges of the plurality of panels 120. In some embodiments, adjacent pockets 720 may share lateral edges. For example, the first lateral edge 726 of one pocket 720 is the same as the second lateral edge 728 of an adjacent pocket 720. As discussed in further detail below, the perimeters of the pockets 720 form seals for the panels 120 during press welding of the acoustic absorption system 100.

As shown in FIG. 1, the acoustic absorption system 100 can be fabricated using the sealing die 700 that comprises a plurality of panels 120. Each panel 120 comprises a first edge 122 (or upper edge), a second edge 124 (or lower edge), a first lateral edge 126 (or first side edge), and a second lateral edge 128 (or second side edge). The lateral edges 126, 128 of adjacent panels 120 are the same.

Figure 7:
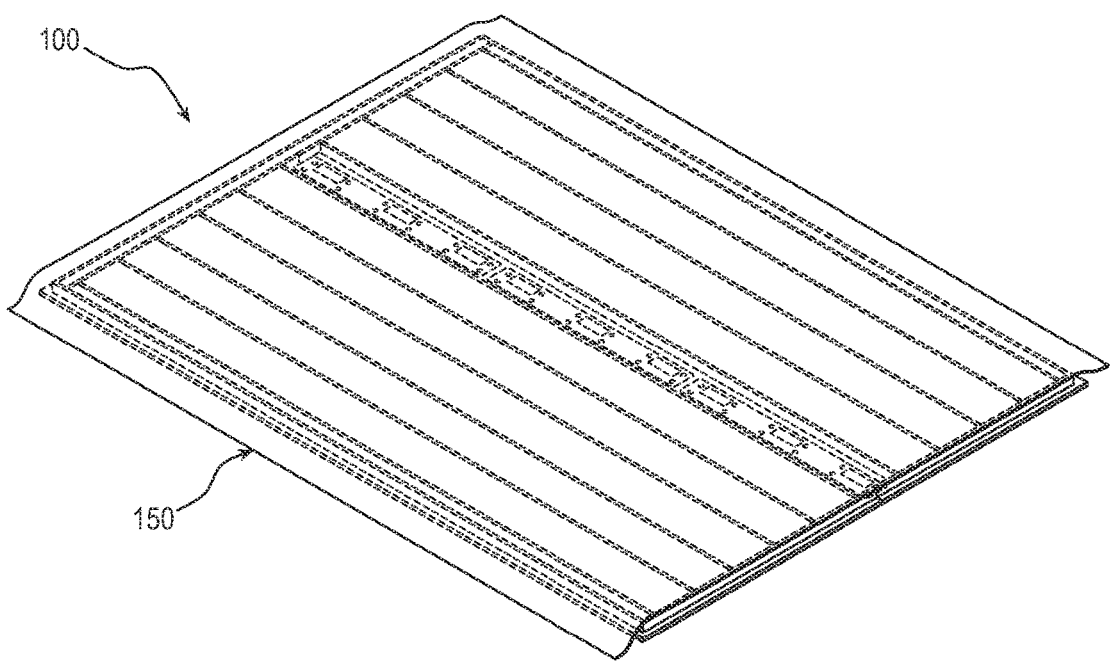
FIG. 7 illustrates laying a first layer of material over the sealing die of FIG. 6.

FIG. 7 illustrates step S602 of the manufacturing method 600 of the acoustic absorption system 100 using press welding. Step S602 includes laying a first layer of material 150 over the sealing die 700. Portions of the sealing die 700 that are covered by the first layer of material 150 are illustrated in phantom lines. The first layer of material 150 may be a polymeric material. In some embodiments, the polymeric material may comprise polyethylene, polyethylene terephthalate, vinyl, polyvinyl, or a blend thereof. This first layer of material 150 may correspond with the second face 123 of the panel 120. The first layer of material 150 may overlap the edges 702, 704, 706, and 708 of the sealing die 700 and may be trimmed later during the manufacturing process.

Figure 8:
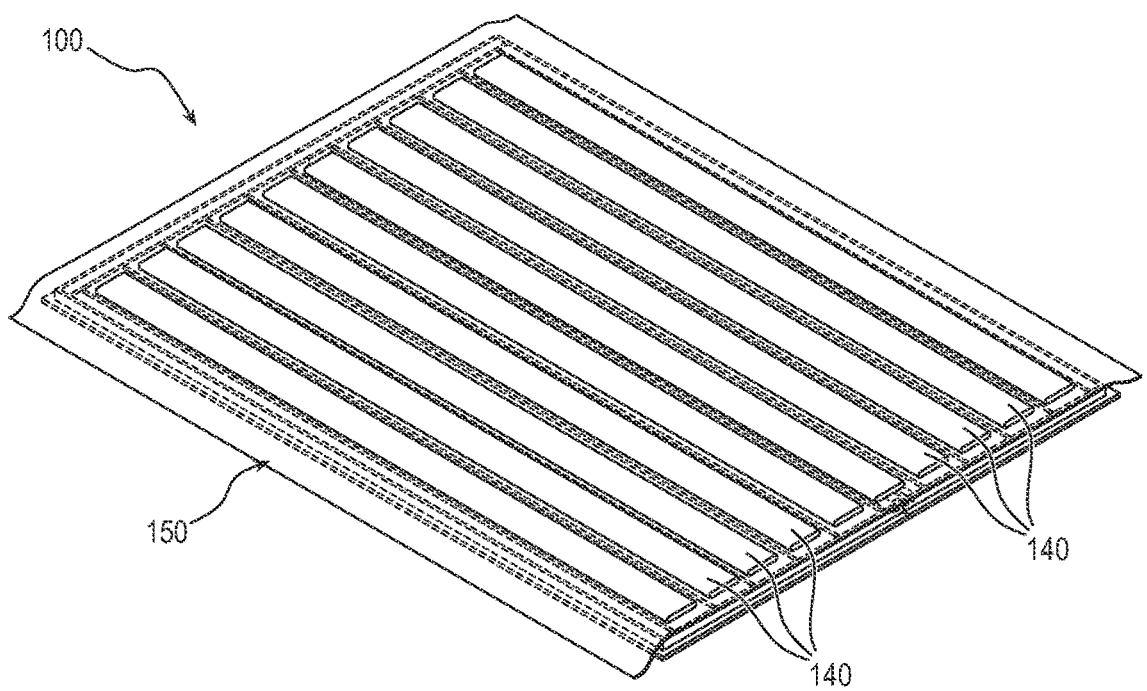
FIG. 8 illustrates placing insulating sheets on top of the first layer of material of FIG. 7.

FIG. 8 illustrates step S604 of the manufacturing method 600 of the acoustic absorption system 100. Step S604 includes placing insulating sheets 140 on top of the first layer of material 150. After the first layer of material 150 is disposed over the sealing die 700, a plurality of insulating sheets 140 may be placed on top of the first layer of material 150. The insulating sheets 140 may be placed above and/or inside the pockets 720 of the sealing die 700. The insulating sheets 140 may be slightly smaller than the dimensions of the pockets 720 of the sealing die 700 so that the insulating sheets 140 and the first layer of material 150 may be fit within the pockets 720. The number of insulating sheets 140 used may correspond with the number of pockets 720 of the sealing die 700.

In the illustrated embodiment, a single insulating sheet 140 is disposed above and/or in each pocket 720. In other embodiments, a plurality of insulating sheets 140 are disposed above and/or in each pocket 720. For instance, two or more insulating sheets 140 can be stacked (e.g., superimposed one on top of the other) above and/or in each pocket 720. Two or more insulating sheets 140 can be used to absorb and/or dampen different sound energies or frequencies. Two or more insulating sheets 140 can also be disposed adjacent one another (e.g., laterally or longitudinally) within each pocket 720, if desired.

Figure 9:
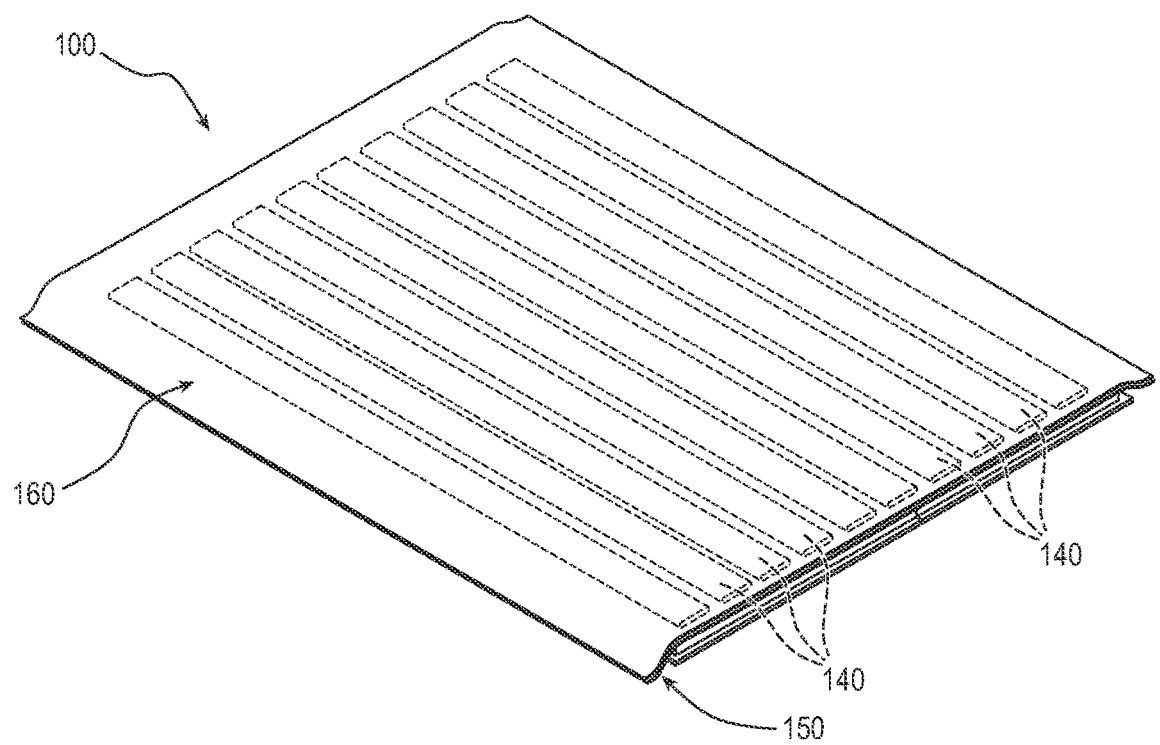
FIG. 9 illustrates laying an adhesive material over the insulating sheets and the first layer of material of FIG. 8.

FIG. 9 illustrates step S606 of the manufacturing method 600 of the acoustic absorption system 100. Step S606 includes laying an adhesive material 160 over the insulating sheets 140 and the first layer of material 150. In other words, after the insulating sheets 140 are placed on top of the first layer of material 150, an adhesive material 160 can optionally be laid over the insulating sheets 140 and the first layer of material 150. The insulating sheets 140 are shown in phantom lines because the adhesive material 160 is placed over the insulating sheets 140. The adhesive material 160 may be a sheet of adhesive that is configured to melt and adhere during the press welding process. The adhesive material 160 may be PVC adhesive or any other suitable material. In some embodiments, the adhesive material 160 is not a sheet of adhesive material but merely an adhesive spray that is applied to the first layer of material 150 and the insulating sheets 140. In other embodiments, an adhesive material 160 is disposed beneath the insulating sheets 140, between the insulating sheets 140 and the first layer of material 150. In yet further embodiments, no adhesive material 160 is used.

Figure 10:
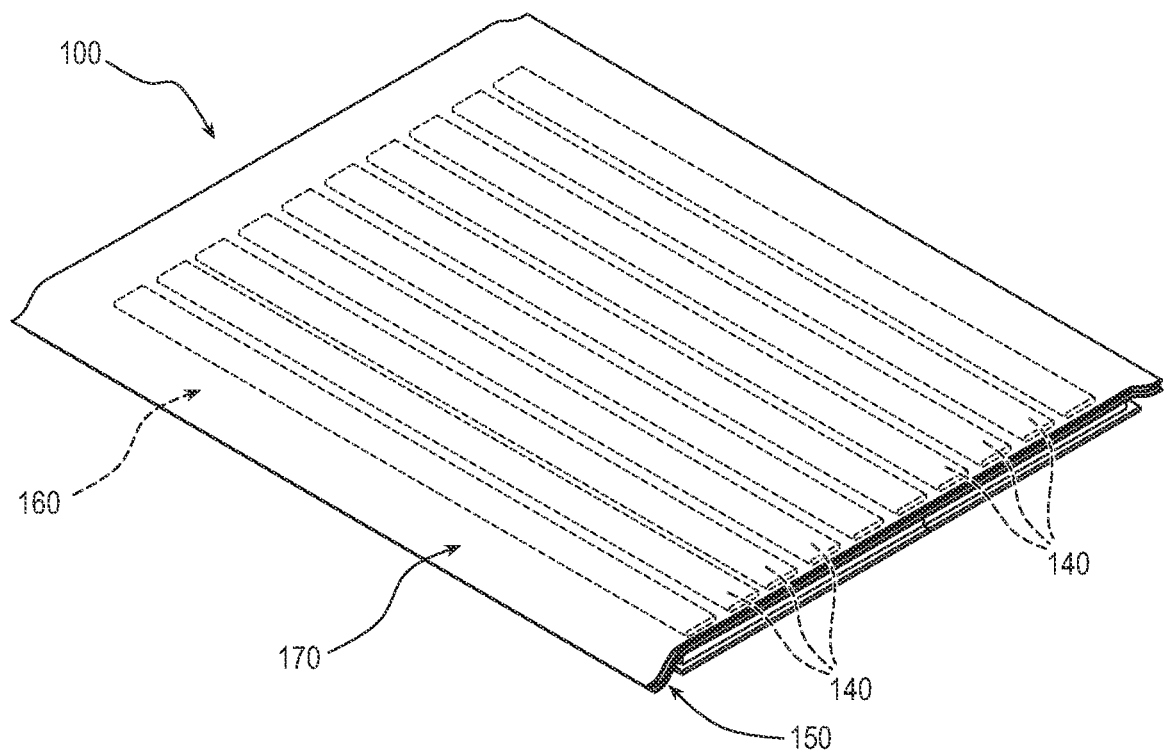
FIG. 10 illustrates laying a second layer of material on top of the adhesive material of FIG. 9.

FIG. 10 illustrates step S608 of the manufacturing method 600 of the acoustic absorption system 100. Step S608 includes laying a second layer of material 170 on top of the adhesive material 160 (and/or insulating sheets 140). In other words, after the adhesive material 160 is laid over the insulating sheets 140 and the first layer of material 150, a second layer of material 170 is laid over adhesive material 160. Alternatively, if no adhesive material 160 is used, or the adhesive material 160 is disposed between the insulating sheets 140 and the first layer of material 150, then a second layer of material 170 can be laid over the insulating sheets 140. The second layer of material 170 may be a polymeric material. In some embodiments, the polymeric material may comprise polyethylene, polyethylene terephthalate, vinyl, polyvinyl, or a blend thereof. This first layer of material 150 may correspond with the first face 121 of the panel 120. In some embodiments, the first layer of material 150 and the second layer of material 170 are the same type of material. In some embodiments, the first layer of material 150 and the second layer of material 170 are piece of material, and the sheet of material may be doubled back over the first layer of material 150, the insulating sheets 140, and the optional adhesive material 160. In other words, the second layer of material 160 folds back onto the first layer of material 150 after the plurality of insulating sheets 140 and the optional adhesive material 160 are placed on top of the first layer of material 150. The second layer of material 170 may overlap the edges 702, 704, 706, and 708 of the sealing die 700, similar to the first layer of material 150, and may be trimmed later during the manufacturing process.

Step S610 includes applying a press weld to form the acoustic absorption system 100. Press welding comprises pressing two plates together to form the acoustic absorption system 100. A first plate may be the sealing die 700 as described above and a second plate (not shown) may be a flat plate. The plates are pressed together with the stack of materials (the first layer of material 150, the insulating sheets 140, the optional adhesive material 160, and the second layer of material 170) disposed between the plates. A current can be passed through the plates and the stack of material is melted (forming seals) at any contact points between the plates due to the thermal energy generated by the current and pressure. After a predetermined amount of energy is reached at the points of contact, the current is stopped. In some embodiments, RF energy is used to apply the heat seals or heat welds to the layers of material 150, 170. As can be appreciated, the press weld can be employed to form a plurality of panels 120 within an acoustic absorption system 100 simultaneously.

Figure 11:
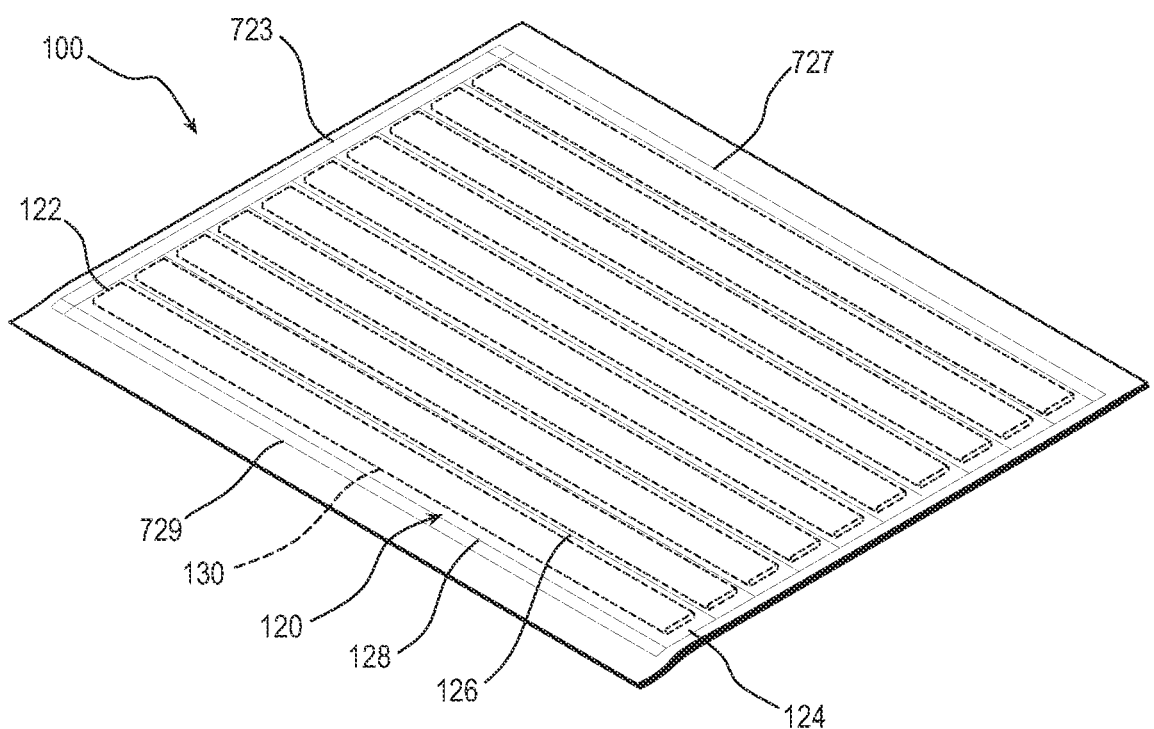
FIG. 11 illustrates an acoustic absorption system after welding and trimming, according to one embodiment of the present disclosure.

As further shown in the illustrated embodiment, the points of contact between the plates are based on the shape of the sealing die 700. As illustrated in FIG. 6, each pocket 720 has a perimeter with an upper edge 722, a lower edge 724, and two lateral edges 726 and 728. The perimeter of each pocket 720 is a contact point that creates a seal when melted that encompasses a corresponding insulating sheets 140. The entire perimeter is sealed simultaneously. As shown in FIG. 11, additional contact points may be along the first lateral edge 726 and the second lateral edge 728, thereby creating a first lateral seal and a second lateral seal with the plurality of panels 220 disposed between the first lateral seal 727 and the second lateral seal 729. In some embodiments, an additional contact point may be along the first edge 722, thereby creating a first seal 723. The space between seals along an upper or lateral side edge can be used to add features for coupling the acoustic absorption system 100 to a building structure, an extension member, another acoustic absorption system 100, or other structure. In some embodiments, the space between the seal 723 and the upper edge is greater than the illustrated embodiment. The space between the seal 723 and the upper edge may be customized to a variety of different lengths to customize the height of the acoustic absorption system 100. In other embodiments, an extension member may be used to customize the height of the acoustic absorption system 100. The different lengths of the space (with or without an extension member) may enable the acoustic absorption system 100 to be used in a number of different situations. For example, the height of ceiling for various rooms vary, and the space (and/or the extension member) may be between the seal 723 and the upper edge may enable the acoustic absorption system 100 to be used in rooms with different ceiling heights. For instance, one or more grommets can be disposed in the space between seals along an upper or lateral side edge of the acoustic absorption system 100 if desired.

After the plates and the acoustic absorption system 100 cool down, the edges of the acoustic absorption system 100 may be trimmed. In other words, any portion of the acoustic absorption system 100 that overlaps the edges of the plates (e.g., the perimeter of the sealing die 700) may be trimmed so that the edges of the acoustic absorption system 100 have an aesthetic appearance. The plates themselves may be used as a template for trimming the acoustic absorption system 100.

FIG. 11 illustrates a final product of the acoustic absorption system 100 after the acoustic absorption system 100 has been welded and trimmed. Each panel comprises a perimeter seal that encompasses the insulating sheet 140 (shown in phantom lines) within a compartment 130 of the panel 120.

The plurality of panels 120 of the acoustic absorption system 100 are foldable relative to each other in the lateral direction along lateral edges 126, 128 of the perimeter of the seals such that adjacent panels 120 become substantially superimposed with each other. If desired, an extension member can thereafter be added to the acoustic absorption system 100 (like the extension members previously discussed).

Figure 12:
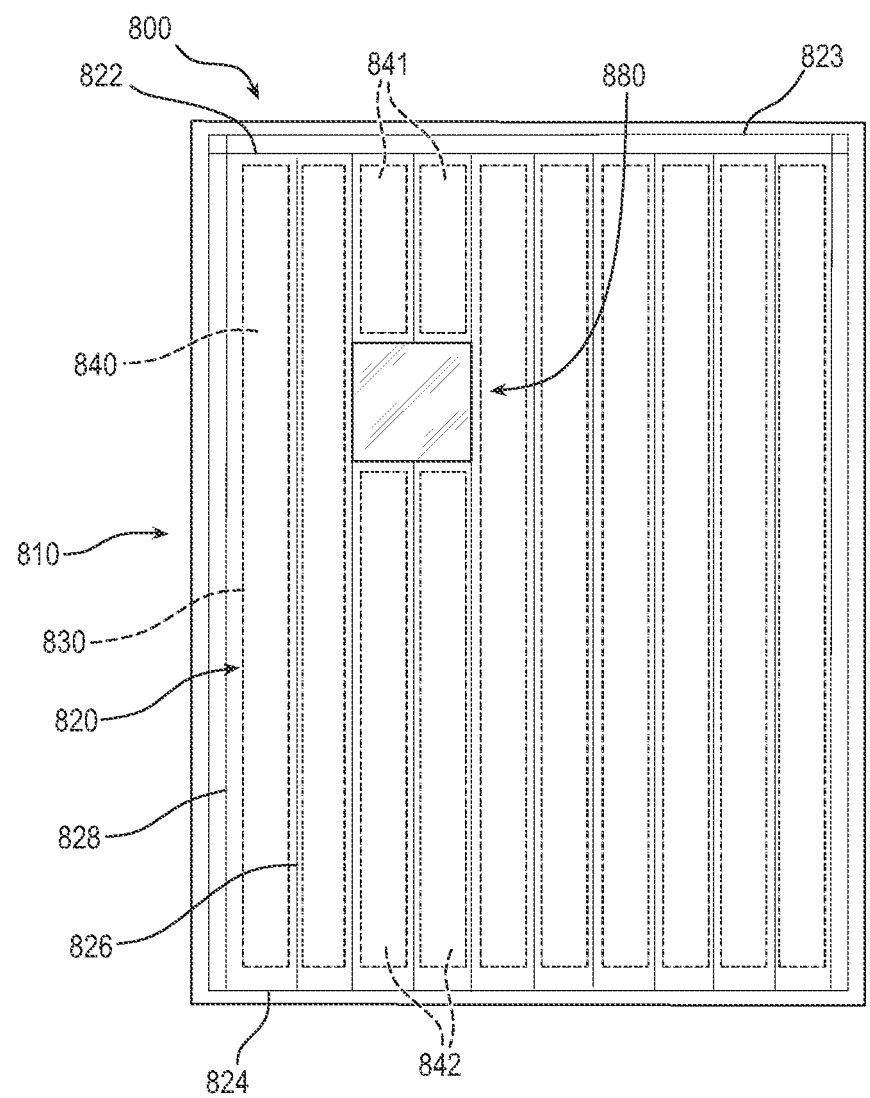
FIG. 12 illustrates an acoustic absorption system according to another embodiment of the present disclosure.

FIG. 12 illustrates an embodiment of an acoustic absorption system 800 that resembles the acoustic absorption system 100 described above in certain respects. The acoustic absorption system 800 may comprise a flexible curtain 810. The flexible curtain 810 comprises one or more acoustic absorption panels 820, each of which may comprise a pocket or compartment 830 (shown in phantom). A sound absorbing or insulating sheet 840 (shown in phantom) may also be disposed within the compartment 830. Each panel 820 comprises a first edge 822 (or upper edge), a second edge 824 (or lower edge), a first lateral edge 826 (or first side edge), and a second lateral edge 828 (or second side edge). The lateral edges 826, 828 of adjacent panels 820 are also coupled together. In some embodiments, individual panels 820 are formed from a single curtain 810. For example, a curtain 810 can be divided, such as by seals (e.g., heat seals or welds), to form a plurality of panels 820 and compartments 830. In other embodiments, a plurality of panels 820 can be joined together to form a curtain 810.

In the illustrated embodiment, the acoustic absorption system 800 further comprises a window 880. The window 880 may be transparent. The window 880 may be fabricated from a clear, transparent plastic material. Exemplary materials may include polycarbonate, polymethyl methacrylate (PMMA), polyethylene terephthalate (PET), amorphous copolyester (PETG), polyvinyl chloride (PVC), liquid silicone rubber (LSR), cyclic olefin copolymers, polyethylene, ionomer resin, transparent polypropylene (PP), fluorinated ethylene propylene (FEP), styrene methyl methacrylate (SMMA), styrene acrylonitrile resin (SAN), polystyrene, methyl methacrylate acrylonitrile butadiene styrene (MABS), and combinations thereof. The material for the window 880 may also be a fire resistant or fire rated material. Additional materials can also be used.

In the illustrated embodiment, the window 880 is formed in two adjacent panels 820 and has a rectangular shape. However, the present disclosure is not so limited and the window 880 may be a number of different shapes, such as square, circular, oval, triangular, and the like. In the illustrated embodiments, the window 880 is formed in an upper section of the acoustic absorption system 800, but the window 880 may be formed in various locations of the acoustic absorption system 800. In some embodiments, the height of the window 880 when the acoustic absorption system 800 is hung is at about the average height of an adult human. For example, the window 880 may hang somewhere between 5 feet and 6 feet off of the floor when hung.

The insulating sheets 840 in the adjacent two panel 820 that define the window 880 are shortened to accommodate the window 880. For example, insulating sheets 841 are disposed above the window 880 are of a similar length and insulating sheets 842 are disposed below the window 880 are of a similar length as well. In some embodiments, the upper insulating sheets 841 are shorter than the lower insulating sheets 842. In some embodiments, the length of the upper insulating sheets 841 and the lower insulating sheets 842 are the same length. In the illustrated embodiment, the bottom of the insulating sheets 841 and the tops of the insulating sheets 842 are squared off. In some embodiments, the bottom of the insulating sheets 841 and the top of the insulating sheets 842 may have a different shape to accommodate a differently shaped window 880.

While the window 880 in the illustrated embodiment is only defined in two adjacent panels 820, the window 880 may be more or less than two panels 820. For example, the window 880 may extend to three, four, or more panels 820. In some embodiments, the window 880 is only defined in one panel 820. The window 880 defined in one panel may extend the entire height of the panel 820. In some embodiments, the window 880 extends laterally through all of the panels 820 of the acoustic absorption system 800.

The manufacturing process or method discussed above may be altered to accommodate for the window 880. For example, a hole for the window 880 may be cut in the first layer of material 150 and in the second layer of material 160 and replaced with a transparent material for the window 880. In addition, when the insulating sheets 840 are placed on top of the first layer of material 150 and/or inside the pockets 720 of the sealing die 700, the appropriately sized insulating sheets 841, 842 are used to accommodate for the window 880. The panels 820 that include the insulating sheets 841, 842 are also sealed above the below the aperture for the window 880.

In some embodiments, transparent material for the window 880 may be added before or after the press welding. If the transparent material for the window 880 is added before the press welding, the window 880 may include a crease from the press welding. The crease may be beneficial as it may help with the folding of the adjacent panels 820 relative to each other. If the transparent material for the window 880 is added after the press welding, the window would not include a crease as illustrated in FIG. 12.

The space between seals along an upper or lateral side edge can be used to add features for coupling the acoustic absorption system 800 to a building structure, an extension member, another acoustic absorption system 800, or other structure. For instance, one or more grommets can be disposed in the space between a seal 823 along an upper of the acoustic absorption system 800 if desired.

As can be appreciated, the curtain employed by the methods and/or systems disclosed herein can be various sizes. For example, in some embodiments, the curtain, which optionally comprises an extension member, can extend from a ceiling structure to the floor (or an area near the floor). With continued reference to FIG. 3A, in some embodiments, the height 290 of the curtain 210 (excluding the extension member 250) can be between about 60 and about 130 inches, between about 60 and about 120 inches, between about 60 and about 90 inches, between about 62 and about 88 inches, between about 64 and about 86 inches, or between about 66 and about 84 inches. In some of such embodiments, the height 290 of the extension member 250 can be between about 12 and about 40 inches, or between about 18 and about 36 inches.

In some embodiments, the length 294 of the curtain 210 is between about 48 and about 84 inches, or between about 54 and about 72 inches. In other embodiments, the length 294 of the curtain 210 is between about 24 and about 36 inches. Other heights, lengths, and/or sizes of curtains can also be used.

Further, the panels 220 of the curtains 210 can be various sizes. For example, in certain embodiments, the width 296 of the panels 220 of the curtain 210 can be between about 2 and about 8 inches, between about 2½ and about 8 inches, or between about 4 and about 7 inches. In other embodiments, the width 296 of the panels 220 is about 6 inches. The number of panels 220 can also vary. For example, in certain embodiments, the curtain 210 comprises between about 6 and about 12 panels, or between about 8 and about 12 panels 220. In other embodiments, the curtain 210 comprises between about 4 and 6 panels 220. In yet further embodiments, the curtain comprises no greater than about 12 panels 220. The number of panels 220, the width 296 of the panels 220, and the thickness of the panels 220 can also be selected such that the curtain 210 folds appropriately.

For example, in some embodiments, the thickness of the curtain 210 is between about ¼ inch and about 4 inches, between about ¼ inch and about 3 inches, or between about ½ inch and about 2 inches. Greater or lesser thicknesses can also be used, such as less than about 3 inches, less than about 2½ inches, less than about 2 inches, less than about 1 inch, or less than about ½ inch.

EXAMPLES

The following examples are exemplary and are not intended to be exhaustive of the embodiments disclosed herein.

Example 1

A flexible acoustic absorption curtain was prepared using a cleanable, flame resistant, polymeric material. The curtain was coupled to a mesh extension member using a zipper element. The height of the curtain was about 84 inches, and the height of the extension member was about 18 inches. The width of the curtain was about 60 inches. The curtain included 10 panels, each panel being about 6 inches wide. Each panel further included a compartment having an insulating sheet disposed therein. The insulating sheets were formed using polyester having a density of about 4.5 lb/ft$^3$. The thickness of the insulating sheets was about ½ inch.

The curtain was hung from a ceiling structure and absorbed sound well. The curtain was also able to be opened and closed, with each panel being substantially superimposable on an adjacent panel. The curtain was also flexible and cleanable. The curtain was also easily uncoupled from the extension member by uncoupling the zipper element.

Example 2

A flexible acoustic absorption curtain was prepared using a cleanable, flame resistant, polymeric material. The height of the curtain was about 84 inches. The width of the curtain was about 60 inches. The curtain included 10 panels, each panel being about 6 inches wide. Each panel further included a compartment having an insulating sheet disposed therein. The insulating sheets were formed using polyester having a density of about 4.5 lb/ft$^3$. The thickness of the insulating sheets was about ½ inch.

Figure 13A:
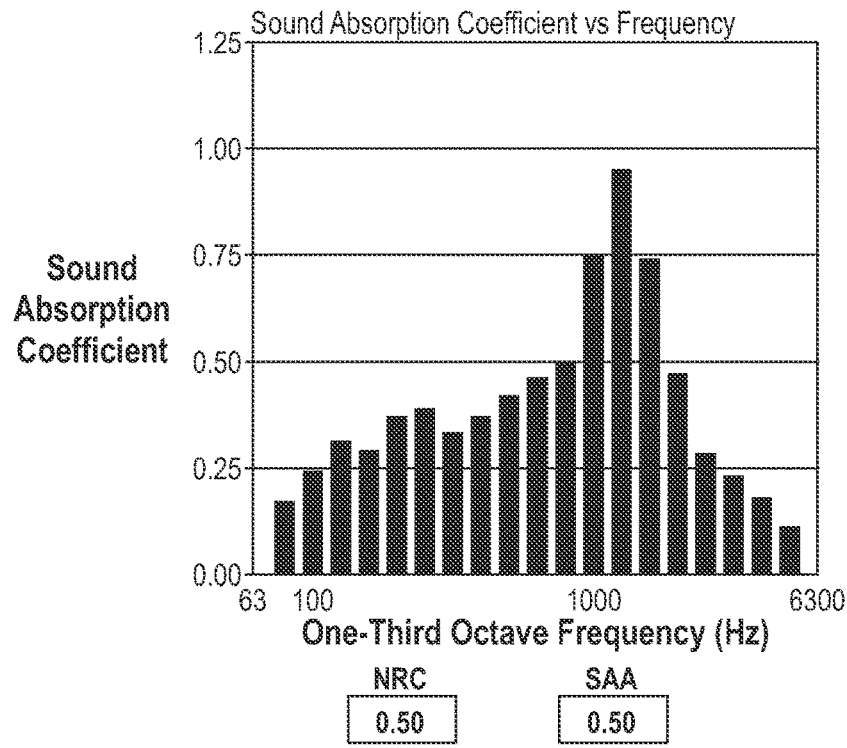
FIG. 13A illustrates a graph of sound absorption coefficient versus frequency in accordance with an embodiment.

A sound absorption test was performed on the curtain following the ASTM C 423-17 standard test method and the ASTM E795-16 standard test method. The results are illustrated in FIG. 13A. The Noise Reduction Coefficient (NRC) was calculated by rounding the sound absorption coefficients for 250, 500, 1000, and 2000 Hz to the nearest 0.05. The Sound Absorption Average (SAA) was calculated by rounding the sound absorption coefficients for the twelve frequencies from 200 HZ to 2500 Hz to the nearest 0.01. The NRC for the curtain of Example 2 is 0.50 and the SAA for Example 2 is 0.50.

Figure 13B:
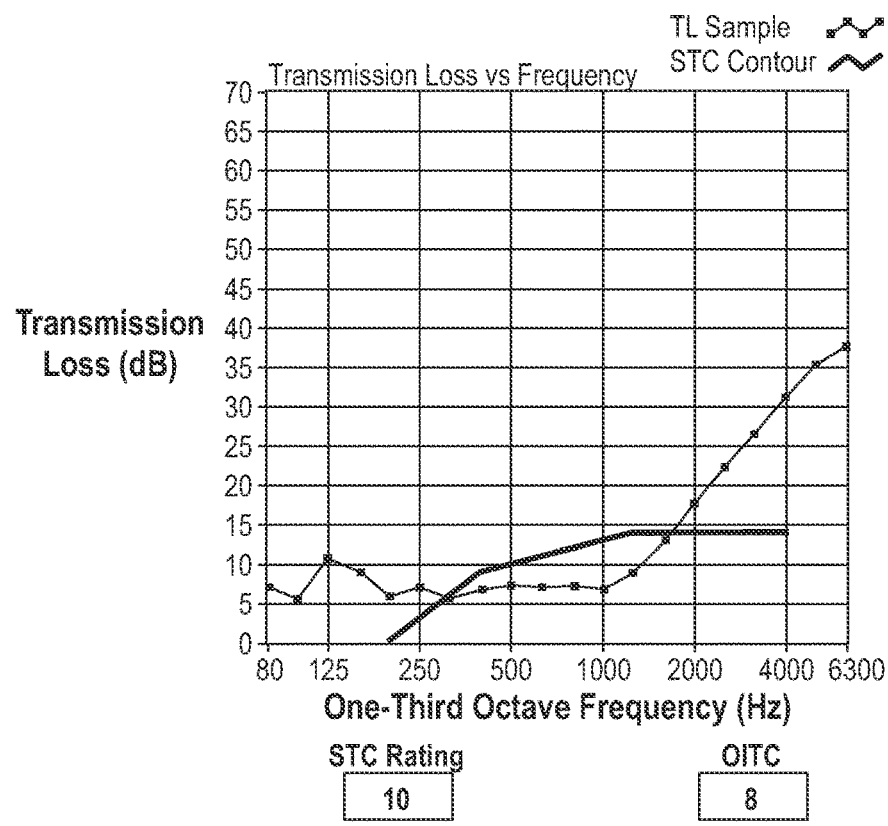
FIG. 13B illustrates a graph of transmission loss versus frequency in accordance with an embodiment.

A sound transmission test was performed on the curtain following the ASTM:E90(09) standard test method. The Sound Transmission Class (STC) value was obtained by applying the Transmission Loss (TL) values to the STC reference contour of ASTM:E413(10). The actual transmission loss at each frequency was calculated by the following equation:

$$TL = NR + 10 \log S - 10 \log A2$$

where: TL=Transmission Loss (dB)
NR=Noise Reduction (dB)
S=Surface area common to both sides (sq. ft.)
A2=Sound absorption of the receiving room with the sample in place (sabins)
The results are illustrated in FIG. 13B. The STC rating was 10.

An Outdoor-Indoor Transmission Class (OITC) procedure was performed using the ASTM:E1332 (10) standard test method. The OITC was calculated using the sound transmission loss values in the 80 to 4000 Hz range as measured in accordance with ASTM 3-90(09). The transmission loss data are then used to determine the A-weighted sound level reduction of the specimen for the reference source spectrum specified in Table 1 of ASTM E1332(10). The appropriate calculations were made to determine the OITC value. TL measurements were obtained in a single direction, from the source room to the receiving room. The source room had a volume of 2948 ft$^3$ (83 m$^3$) and the receiving room had a volume of 5825 ft$^3$ (165 m$^3$). The OITC rating was 8.

Example 3

Another flexible acoustic absorption curtain was prepared using a cleanable, flame resistant, polymeric material. The height of the curtain was about 84 inches. The width of the curtain was about 60 inches. The curtain included 10 panels, each panel being about 6 inches wide. Each panel further included a compartment having an insulating sheet disposed therein. The insulating sheets were formed using polyester having a density of about 9.0 lb/ft$^3$. The thickness of the insulating sheets was about ¼ inch.

Figure 14A:
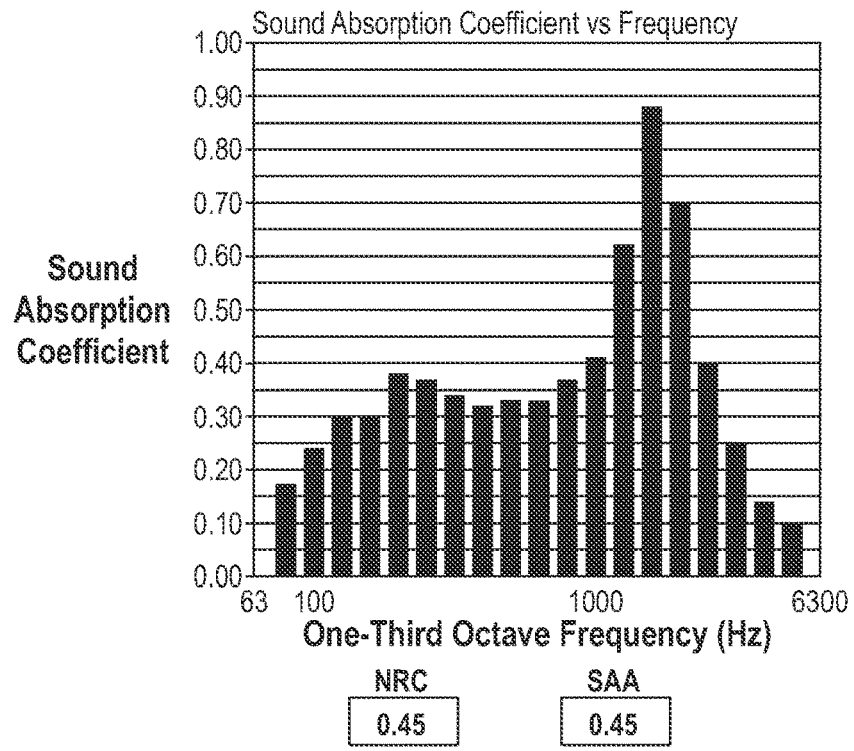
FIG. 14A illustrates a graph of sound absorption coefficient versus frequency in accordance with an embodiment.

A sound absorption test was performed on the curtain following the ASTM C 423-17 standard test method and the ASTM E795-16 standard test method. The results are illustrated in FIG. 14A. The NRC was calculated by rounding the sound absorption coefficients for 250, 500, 1000, and 2000 Hz to the nearest 0.05. The SAA was calculated by rounding the sound absorption coefficients for the twelve frequencies from 200 Hz to 2500 Hz to the nearest 0.01. The NRC for example 3 is 0.45 and the SAA for example 3 is 0.45.

Figure 14B:
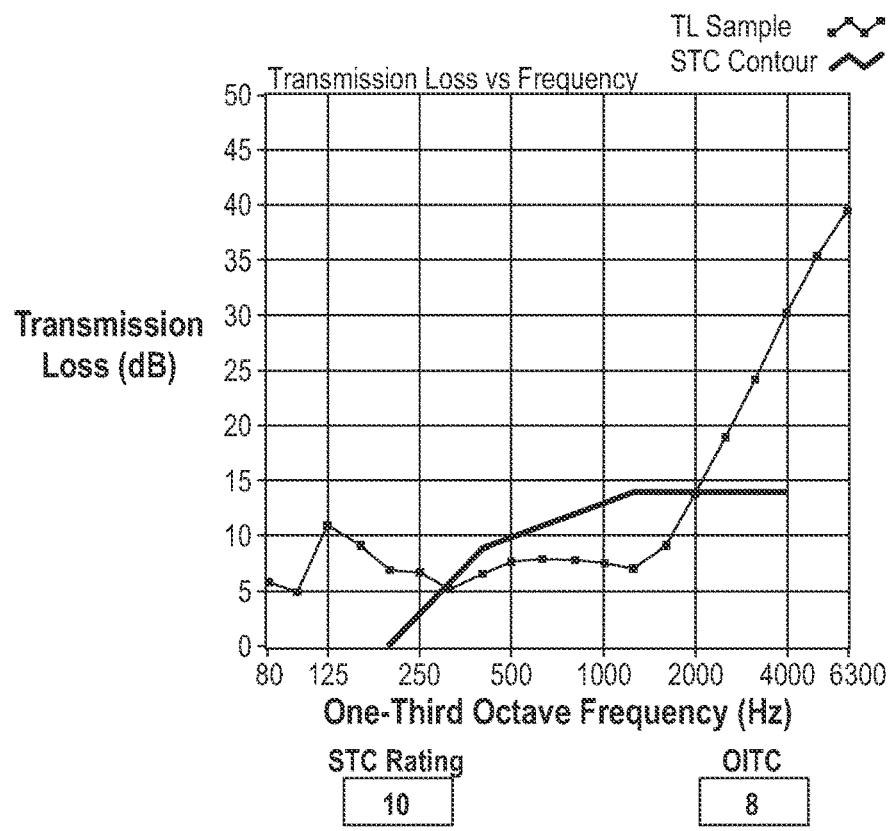
FIG. 14B illustrates a graph of transmission loss versus frequency in accordance with an embodiment.

A sound transmission test was performed on the above-noted curtain following the ASTM:E90(09) standard test method. The STC value was obtained by applying the TL values to the STC reference contour of ASTM:E413(10). The actual transmission loss at each frequency was calculated by the following equations:

$$TL = NR + 10 \log S - 10 \log A2$$

where: TL=Transmission Loss (dB)
NR=Noise Reduction (dB)
S=Surface area common to both sides (sq. ft.)
A2=Sound absorption of the receiving room with the sample in place (sabins)
The results are illustrated in FIG. 14B. The STC rating was 10.

An OITC procedure was performed using the ASTM:E1332 (10) standard test method. The OITC was calculated using the sound transmission loss values in the 80 to 4000 Hz range as measured in accordance with ASTM 3-90(09). The transmission loss data are then used to determine the A-weighted sound level reduction of the specimen for the reference source spectrum specified in Table 1 of ASTM E1332(10). The appropriate calculations were made to determine the OITC value. TL measurements were obtained in a single direction, from the source room to the receiving room. The source room had a volume of 2948 ft$^3$ (83 m$^3$) and the receiving room had a volume of 5825 ft$^3$ (165 m$^3$). The OITC rating was 8.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

References to approximations are made throughout this specification, such as by use of the terms "about" or "approximately." For each such reference, it is to be understood that, in some embodiments, the value, feature, or characteristic may be specified without approximation. For example, where qualifiers such as "about," "substantially," and "generally" are used, these terms include within their scope the qualified words in the absence of their qualifiers. Further, all ranges include both endpoints.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. The scope of the invention is therefore defined by the following claims and their equivalents.

The invention claimed is:

1. A method of manufacturing an acoustic absorption system, comprising:
   laying a first layer of material over a sealing die, wherein the sealing die comprises a plurality of pockets;
   placing a plurality of insulating sheets on top of the first layer of material so that each insulating sheet is disposed within a perimeter of a corresponding pocket of the sealing die;

laying a second layer of material over the insulating sheets and the first layer of material; and press welding to seal the plurality of insulating sheets between the first layer of material and the second layer of material, wherein each insulating sheet is disposed entirely within a compartment encompassed by seals defined by the perimeter of the corresponding pocket, and an entire perimeter of each compartment is sealed simultaneously, wherein the seals form a plurality of panels, and wherein the plurality of panels of the acoustic absorption system are foldable relative to each other in a lateral direction along vertical portions of the seals of the perimeter of each compartment.

2. The method of claim 1, further comprising laying an adhesive material over the insulating sheets and the first layer of material, wherein the adhesive material is disposed between the insulating sheets and the second layer of material.

3. The method of claim 1, further comprising laying an adhesive material between the insulating sheets and the first layer of material.

4. The method of claim 1, further comprising trimming edges of the acoustic absorption system.

5. The method of claim 1, wherein press welding creates a first lateral seal at a first lateral edge of the acoustic absorption system and a second lateral seal a second lateral edge of the acoustic absorption system, wherein the plurality of panels are disposed between the first lateral seal and the second lateral seal.

6. The method of claim 1, wherein press welding creates a first seal at a first edge of the acoustic absorption system disposed above the plurality of panels.

7. The method of claim 1, wherein the first layer of material and the second layer of material are the same piece of material such that the second layer of material folds back onto the first layer of material after the plurality of insulating sheets are placed on top of the first layer of material.

8. The method of claim 1, wherein the first layer of material and the second layer of material are made of a polymeric material that comprises polyethylene, polyethylene terephthalate, vinyl, polyvinyl, or a blend thereof.

9. The method of claim 1, wherein the plurality of insulating sheets comprises a cotton, polyester, wool, rayon, hemp, burlap, or plastic material.

10. The method of claim 1, wherein each of the plurality of insulating sheets has a density that is between about 1 and about 12 lb/ft$^3$.

11. The method of claim 1, wherein each of the plurality of insulating sheets has a thickness that is between about ⅛ and about 1 inch.

12. The method of claim 1, wherein the plurality of pockets extend in the height direction of the sealing die.

13. The method of claim 1, wherein the sealing die comprises a plurality of portions that are couplable together.

14. The method of claim 1, wherein press welding comprises applying RF energy to form heat seals.

15. The method of claim 1, further comprising:
cutting an aperture in a first layer of material for a window in the acoustic absorption system; and
cutting a corresponding aperture in the second layer of material for the window in the acoustic absorption system,
wherein the placing of the plurality of insulating sheets on top of the first layer of material includes placing appropriately sized insulating sheets to accommodate the window.

16. The method of claim 15, wherein a transparent material is attached to the acoustic absorption system within the aperture and the corresponding aperture to create the window.

17. An acoustic absorption curtain, comprising:
a first layer of material;
a second layer of material; and
a plurality of panels, each comprising a compartments formed between the first and second layers of material, and an insulating sheet disposed entirely within the compartment;
wherein the panels are formed by press welding portions of the first and second layers of material together to form a seal around a perimeter of each compartment, and
wherein the plurality of panels are foldable relative to each other in a lateral direction along vertical portions of the seals of the perimeter of each compartment.

18. The acoustic absorption curtain of claim 17, wherein the density of each insulating sheets is between about 8 lb/ft$^3$ and about 12 lb/ft$^3$, and the thickness of each of the plurality of insulating sheets is between about ⅛ inch and about ⅝ inch.

* * * * *

UNITED STATES PATENT AND TRADEMARK OFFICE
CERTIFICATE OF CORRECTION

PATENT NO. : 12,118,972 B2  
APPLICATION NO. : 17/452964  
DATED : October 15, 2024  
INVENTOR(S) : Benjamin F. Forrest Page 1 of 1

It is certified that error appears in the above-identified patent and that said Letters Patent is hereby corrected as shown below:

In the Claims

Claim 17, Column 18, Line 29 reads "...each comprising a compartments..." which should read "...each comprising a compartment..."

Claim 18, Column 18, Line 41 reads "...the density of each insulating sheets..." which should read "...the density of each insulating sheet..."

Signed and Sealed this  
Fourth Day of February, 2025

Coke Morgan Stewart  
*Acting Director of the United States Patent and Trademark Office*